United States Patent
Gadiwan et al.

(10) Patent No.: US 12,261,269 B2
(45) Date of Patent: Mar. 25, 2025

(54) POLY-IONIC ELECTROLYTE FOR HIGH ENERGY DENSITY STORAGE DEVICES

(71) Applicant: GEGADYNE ENERGY LABS PVT LTD, Thane (IN)

(72) Inventors: Ameya Pradeep Gadiwan, Mumbai (IN); Jubin Varghese Kannammoottil, Mumbai (IN)

(73) Assignee: GEGADYNE ENERGY LABS PVT LTD, Thane (IN)

( * ) Notice: Subject to any disclaimer, the term of this patent is extended or adjusted under 35 U.S.C. 154(b) by 761 days.

(21) Appl. No.: 17/291,007

(22) PCT Filed: Sep. 30, 2019

(86) PCT No.: PCT/IN2019/050721
§ 371 (c)(1),
(2) Date: May 4, 2021

(87) PCT Pub. No.: WO2020/095314
PCT Pub. Date: May 14, 2020

(65) Prior Publication Data
US 2022/0045363 A1    Feb. 10, 2022

(30) Foreign Application Priority Data

Nov. 5, 2018 (IN) .............................. 201821041846

(51) Int. Cl.
H01M 10/0568    (2010.01)
H01G 11/60      (2013.01)
H01M 10/0525    (2010.01)
H01M 10/0569    (2010.01)

(52) U.S. Cl.
CPC ........ *H01M 10/0568* (2013.01); *H01G 11/60* (2013.01); *H01M 10/0525* (2013.01); *H01M 10/0569* (2013.01); *H01M 2300/0037* (2013.01)

(58) Field of Classification Search
CPC  H01G 11/60; H01G 11/62; H01M 2300/0037
See application file for complete search history.

(56) References Cited

U.S. PATENT DOCUMENTS 10,026,995 B2    7/2018  Zhamu et al.

FOREIGN PATENT DOCUMENTS

JP    2007/012983    *    1/2007
JP    6151910 B2         6/2017

OTHER PUBLICATIONS

Zhou et al., "Poly(ionic liquid) hydrogels exhibiting superior mechanical and electrochemical properties as flexible electrolytes," J. Mater. Chem. A, 2016, 4, 1112-1118.
Taghavikish et al., "A Poly(ionic liquid) Gel Electrolyte for Efficient all Solid Electrochemical Double-Layer Capacitor," Scientific Reports, Jul. 19, 2018; 8(1), 10918.
Written Opinion of International Searching Authority re PCT/IN2019/050721; International Filing Date: Sep. 30, 2019; Applicant: Gegadyne Energy Labs PVT Ltd; Mailing Date Mar. 1, 2020; 6 pages.
International Search Report for PCT/IN2019/050721; International Filing Date: Sep. 30, 2019; Applicant: Gegadyne Energy Labs PVT Ltd; 3 pages.

* cited by examiner

*Primary Examiner* — C Melissa Koslow
(74) *Attorney, Agent, or Firm* — Kramer & Amado, P.C.

(57) ABSTRACT

A poly-ionic liquid composition comprises a mixture of at least one ionic liquid, at least one salt, and at least one organic solvent. The poly-ionic electrolyte as disclosed in this disclosure has an operating voltage in range of 3.5-4.5V.

16 Claims, 1 Drawing Sheet

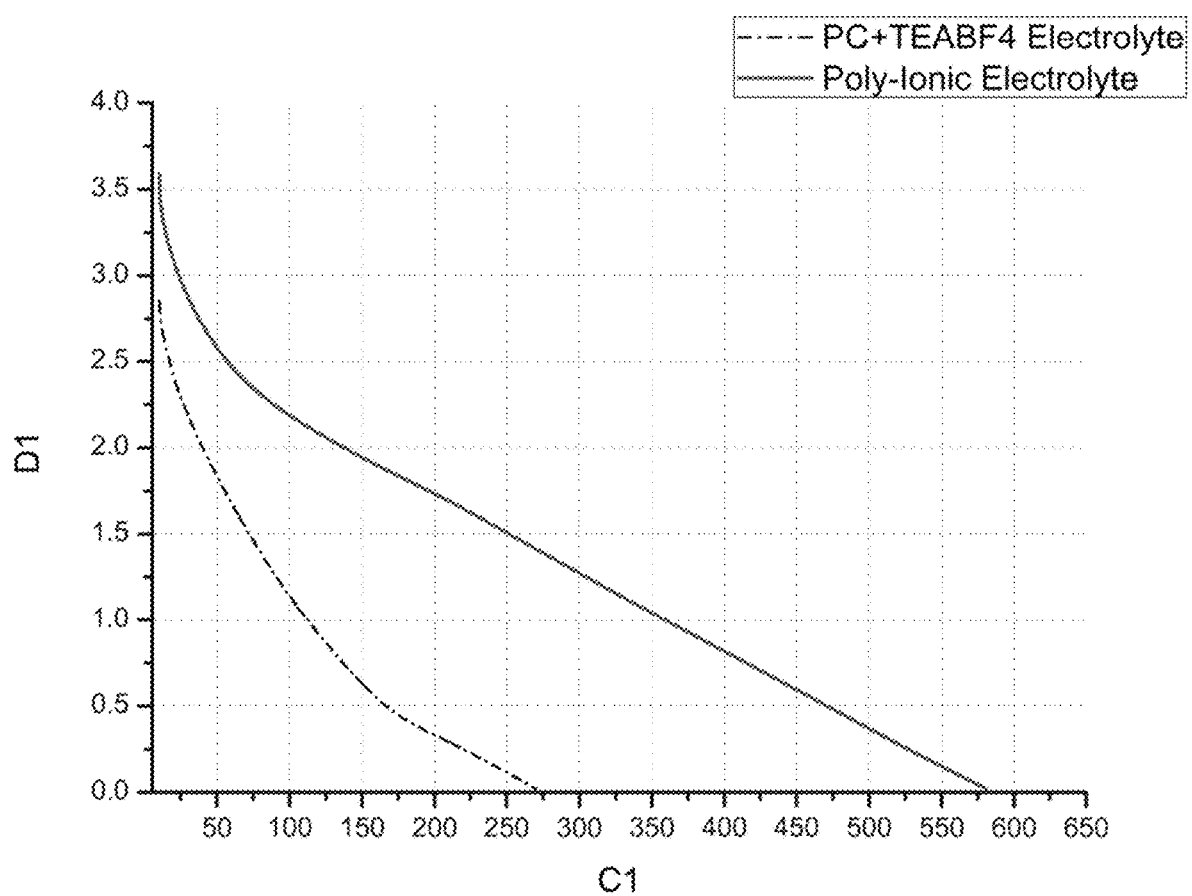

POLY-IONIC ELECTROLYTE FOR HIGH ENERGY DENSITY STORAGE DEVICES

TECHNICAL FIELD OF THE INVENTION

The present disclosure relates to an electrolyte composition that enhances energy density of energy storage devices. More particularly, the present disclosure relates to a Poly Ionic electrolyte to be used in energy storage devices, enhancing energy densities of the devices thereof.

BACKGROUND

All electrochemical energy storage devices require electrolytes to store and deliver energy. Initially, electrochemical devices used water-based electrolytes. However, it was soon realized that water-based electrolytes yielded a very small usable potential window that is approximately 1.23V. This means that there were limitations on the quantum of energy that could have been stored in these devices. The discovery and use of organic solvents allowed high energy electrochemical devices to come into practice. The most recognizable example of such high energy devices is the lithium ion battery. These organic electrolytes generally comprise of an organic solvent (e.g. Acetonitrile) and a salt able to dissociate in the said solvent (e.g. LiPF6). However, in view of limitations of organic solvents, use of ionic electrolyte was proposed. Room Temperature Ionic Liquids are purely molten salts that are liquid near ambient room temperature. With this, an exact value to the ionic size due to the absence of a solvation shell could be established which was the common problem of water-based and organic electrolytes.

Supercapacitors and their charge storage mechanism has long been known. Supercapacitors possess one of the highest power densities out of all the electrochemical energy storage devices. However, supercapacitors suffer from a major drawback that they have low energy densities. Although, there are numerous approaches for tackling the said drawback, the most significant and remarkable effect on the energy stored in these devices is the potential windows of operation. Most commercial devices use organic electrolytes like acetonitrile and LiPF6 or TEABF4. But these electrolytes provide the potential window of 2.7V at most, which is very limited.

With pure ionic liquid as electrolytes, there are several disadvantages associated, such as, high cost, high viscosity, and low conductivity.

With organic solvents as electrolytes, there are several disadvantages associated, such as low voltage, high toxicity, high flammability.

Another approach is suggested as poly(Ionic liquid) gel. Use of poly(Ionic liquid) gel as electrolyte has been studied for some time. A research paper published in Science reports titled "A Poly(ionic liquid) Gel Electrolyte for Efficient all Solid Electrochemical Double-Layer Capacitor" by Taghavikish et. al., DOI 10.1038/s41598-018-29028-y concludes chemically cross-linked PIL gel electrolyte-supported ILs are suitable for solid-state, flexible supercapacitor applications. The chemically crosslinked poly(Ionic liquid) gel electrolyte (PIL) is prepared using 2-hydroxyethylmethacrylate (HEMA) monomer and a polymerisable ionic liquid, 1,4-di(vinylimidazolium)butane bisbromide (DVIMBr) in an ionic liquid (IL-1-butyl-3 methylimidazolium hexafluorophosphate) as the polymerisation solvent, which resulted in in-situ entrapment of the ionic liquid (IL) in the gel during polymerisation and crosslinking of the polymer.

Further, a paper titled "Poly(ionic liquid) hydrogels exhibiting superior mechanical and electrochemical properties as flexible electrolytes" by Tao Zhou et. al., published in Journal of Material Chemistry (DOI: 10.1039/C5TA08166A), studies poly(ionic liquid) hydrogel electrolytes, which may be applicable in fuel cells or supercapacitors.

SUMMARY OF THE INVENTION

To overcome the drawbacks stated, a Poly Ionic electrolyte is described in the present disclosure. The Poly Ionic electrolyte comprises a finely tuned mixture of organic solvents, salts and ionic liquids.

Further, the disclosure provides an energy storage device having an ultra-high energy density. The said device includes a Poly Ionic electrolyte comprises a finely tuned mixture of organic solvents, salts and ionic liquids.

In an embodiment, the Poly Ionic electrolyte comprises a first organic solvent component in 30-47.5%, a second organic solvent component in 30-47.5%, an ionic liquid component in 5-40%, a first salt component having concentration of 0.1M-1M, and a second salt component having concentration of 0.1M-1M.

The organic solvents may be nitrile or carbonate groups. The salts may be halide salts.

Various embodiments disclosed herein relate to a poly-ionic electrolyte composition for enhancing the energy density of electronic storage device, including at least one ionic liquid, at least one salt, and at least one organic solvent. The poly-ionic electrolyte composition has an operating voltage of between 3.5 V and 4.5V. In various embodiments, the ionic liquid is present in an amount ranging from 5% to 40% by volume, based on the total volume of the electrolyte composition. The ionic liquid may be selected from the group consisting of 1-Ethyl-3-methylimidazolium tetrafluoroborate (EMIMBF4), 1-Butyl-3-methylimidazolium tetrafluoroborate (BMIMBF4), 1-ethyl-3-methylimidazolium bromide (EMIMBr), 1-Ethyl-3-methylimidazolium chloride (EMIMCl), 1-Methyl-3-octylimidazolium chloride (OMIMCl), 1-Ethyl-3-methylimidazolium bis(trifluoromethylsulfonyl)imide (EMIMTFSI), 1-ethyl-3-methylimidazolium bis(fluorosulfonyl)amide (EMIMFSA), 1-Ethyl-3-methylimidazolium bis (trifluoromethanesulfonyl)imide (EMIMTf2N), 1-Butyl-3-methylimidazolium bromide (BMIMBr), 1-Butyl-3-methylimidazolium chloride (BMIMCl), 1-Butyl-3-methylimidazolium bis(trifluoromethylsulfonyl)imide (BMIMTFSI), 1-Butyl-3-methylimidazolium bis(fluorosulfonyl)amide (BMIMFSA), 1-Butyl-3-methylimidazolium bis(trifluoromethanesulfonyl)imide (BMIMTf2N), and mixtures thereof.

Various embodiments disclosed herein relate to a poly-ionic electrolyte composition for enhancing the energy density of electronic storage device, including at least one ionic liquid, at least one salt, and at least one organic solvent, where the organic solvent is present in an amount ranging from 30% to 47.5% by volume, based on the total volume of the electrolyte composition. The organic solvent may be a nitrile, a carbonate ester, or a mixture thereof. In various embodiments, the organic solvent is selected from the group consisting of acetonitrile, cyclic carbonate esters of polyhydroxy alcohols, and acyclic carbonate esters. The organic solvent may be selected from the group consisting of propylene carbonate, ethylene carbonate, diethyl carbonate, dimethyl carbonate, and mixtures thereof.

Various embodiments disclosed herein relate to a poly-ionic electrolyte composition for enhancing the energy density of electronic storage device, including at least one ionic liquid, at least one salt, and at least one organic solvent, where the salt is present in a concentration ranging from 0.1M to 1M. The salt may be selected from the group consisting of $LiPF_6$, $LiBF_4$, $NaBF_4$, $NaPF_6$, tetraethylammonium tetrafluoroborate ($TEABF_4$), tetraethylammonium hexafluorophosphate ($TEAPF_6$), spirobipyrrolidinium tetrafluoroborate (SBP—$BF_4$), and combinations thereof.

Various embodiments disclosed herein relate to a poly-ionic electrolyte composition for enhancing the energy density of electronic storage device, where the poly-ionic electrolyte composition includes an ionic liquid present in an amount ranging from 5% to 40% by volume, based on the total volume of the electrolyte composition; a first organic solvent present in an amount ranging from 30% to 47.5% by volume, based on the total volume of the electrolyte composition; a second organic solvent present in an amount ranging from 30% to 47.5% by volume, based on the total volume of the electrolyte composition; a first salt component present in a concentration ranging from 0.1M to 1M, and a second salt component present in a concentration ranging from 0.1M to 1M. The poly-ionic electrolyte composition may have an operating voltage of between 3.5 V and 4.5V. In various embodiments, the ionic liquid may be selected from the group consisting of 1-Ethyl-3-methylimidazolium tetrafluoroborate ($EMIMBF_4$), 1-Butyl-3-methylimidazolium tetrafluoroborate ($BMIMBF_4$), 1-ethyl-3-methylimidazolium bromide (EMIMBr), 1-Ethyl-3-methylimidazolium chloride (EMIMCl), 1-Methyl-3-octylimidazolium chloride (OMIMCl), 1-Ethyl-3-methylimidazolium bis(trifluoromethylsulfonyl)imide (EMIMTFSI), 1-ethyl-3-methylimidazolium bis(fluorosulfonyl)amide (EMIMFSA), 1-Ethyl-3-methylimidazolium bis(trifluoromethanesulfonyl)imide ($EMIMTf_2N$), 1-Butyl-3-methylimidazolium bromide (BMIMBr), 1-Butyl-3-methylimidazolium chloride (BMIMCl), 1-Butyl-3-methylimidazolium bis(trifluoromethylsulfonyl)imide (BMIMTFSI), BMIMFSA, 1-Butyl-3-methylimidazolium bis(trifluoromethanesulfonyl)imide ($BMIMTf_2N$), and mixtures thereof.

Various embodiments disclosed herein relate to a poly-ionic electrolyte composition for enhancing the energy density of electronic storage device, where the poly-ionic electrolyte composition includes an ionic liquid present in an amount ranging from 5% to 40% by volume, based on the total volume of the electrolyte composition; a first organic solvent present in an amount ranging from 30% to 47.5% by volume, based on the total volume of the electrolyte composition; a second organic solvent present in an amount ranging from 30% to 47.5% by volume, based on the total volume of the electrolyte composition; and at least one salt component present in a concentration ranging from 0.1M to 1M. The first and second organic solvents each may be independently selected from the group consisting of acetonitrile, cyclic carbonate esters of polyhydroxy alcohols such as propylene carbonate or ethylene carbonate, and acyclic carbonate esters such as diethyl carbonate or dimethyl carbonate.

Various embodiments disclosed herein relate to a poly-ionic electrolyte composition for enhancing the energy density of electronic storage device, where the poly-ionic electrolyte composition includes an ionic liquid present in an amount ranging from 5% to 40% by volume, based on the total volume of the electrolyte composition; at least one organic solvent; a first salt component present in a concentration ranging from 0.1M to 1M, and a second salt component present in a concentration ranging from 0.1M to 1M. The first and second salt components each each may be independently selected from the group consisting of $LiPF_6$, $LiBF_4$, $NaBF_4$, $NaPF_6$, $TEABF_4$, $TEAPF_6$, SBP—$BF_4$, and combinations thereof.

Various embodiments disclosed herein relate to an energy storage device including a poly-ionic electrolyte, where the electrolyte includes at least one ionic liquid, at least one salt, and at least one organic solvent, and may have an operating voltage of between 3.5 V and 4.5V.

Various embodiments disclosed herein relate to an energy storage device including a poly-ionic electrolyte, where the electrolyte includes:
- an ionic liquid present in an amount ranging from 5% to 40% by volume, based on the total volume of the electrolyte composition;
- a first organic solvent present in an amount ranging from 30% to 47.5% by volume, based on the total volume of the electrolyte composition;
- a second organic solvent present in an amount ranging from 30% to 47.5% by volume, based on the total volume of the electrolyte composition;
- a first salt component present in a concentration ranging from 0.1M to 1M, and
- a second salt component present in a concentration ranging from 0.1M to 1M. The electrolyte may have an operating voltage of between 3.5 V and 4.5V.

Various embodiments disclosed herein relate to a method for preparing a poly-ionic electrolyte composition by drying an organic solvent; adding a salt to the organic solvent to form a salt solution under an inert atmosphere; adding the ionic liquid to the salt solution under the inert atmosphere, and subsequently mixing the composition under the inert atmosphere to obtain a homogeneous solution.

Further, the disclosure provides a method of preparation of a Poly Ionic electrolyte used in an energy storage device. The method comprises drying a first organic solvent component and a second organic solvent component; adding a first salt component and a second salt component into the dried organic solvents; mixing the above ingredients under inert atmosphere; adding ionic liquid component under dry inert atmosphere and subsequently mixing the composition under dry inert atmosphere to obtain homogeneous solution; and storing under argon/nitrogen to suppress creepage of moisture.

BRIEF DESCRIPTION OF THE DRAWINGS

FIG. 1 illustrates a comparative graph. The graph represents the constant current discharge curves of two similar devices, one with a traditional electrolyte, and the other employing the electrolyte disclosed herein. From the graph of FIG. 1, it can be observed that there is a significant increase in the operating voltage as well as the discharge time of the device. Both the devices are being discharged at 1 A/g. By calculation, that results in the device employing a traditional electrolyte to have a specific capacitance of 104 F/g and an energy density of 101 Wh/kg. The device employing the poly-ionic electrolyte of the disclosure yields a specific capacitance of 166 F/g and an energy density of 274 Wh/kg. In this case, that represents a 59% increase in specific capacitance and 171% increase in energy density for the device employing the claimed electrolyte. [All calculations made considering the total weight of active materials on both the electrodes].

DETAILED DESCRIPTION OF THE INVENTION

The present disclosure describes a Poly Ionic electrolyte composition that enhances energy density of energy storage devices. The Poly Ionic electrolyte composition comprises a finely tuned mixture of organic solvents, salts and ionic liquids. The said Poly Ionic electrolyte assists to form a Solid Electrolyte Interface. Further, it may be possible to use pseudocapacitive and battery-like materials in Supercapacitors, due to the said Poly Ionic electrolyte.

In a preferred embodiment, the Poly Ionic electrolyte comprises a first organic solvent component in 30-47.5%, a second organic solvent component in 30-47.5%, an ionic liquid component in 5-40%, a first salt component having concentration of 0.1M-1M, and a second salt component 0.1M-1M.

The organic solvents may be polar organic solvent selected from nitriles such as acetonitrile, carbonate esters of poly hydroxy alcohols such as Propylene Carbonate, Ethylene Carbonate; or carbonate esters of carbonic acid and lower alcohols such as Diethyl Carbonate, Dimethyl Carbonate, and other cyclic carbonates alone or combination thereof. The salts may be halide salts. selected from a group consisting of $LiPF_6$, $LiBF_4$, $NaBF_4$, $NaPF_6$, $TEABF_4$, $TEAPF_6$, SBP—$BF_4$ and such like. Further, the ionic liquid may be selected from a group of 1-Ethyl-3-methylimidazolium tetrafluoroborate ($EMIMBF_4$), 1-Butyl-3-methylimidazolium tetrafluoroborate ($BMIMBF_4$), 1-ethyl-3-methylimidazolium bromide (EMIMBr), 1-Ethyl-3-methylimidazolium chloride (EMIMCl), 1-Methyl-3-octylimidazolium chloride (OMIMCl), 1-Ethyl-3-methylimidazolium bis(trifluoromethylsulfonyl)imide (EMIMTFSI), 1-ethyl-3-methylimidazolium bis(fluorosulfonyl)amide (EMIMFSA), 1-Ethyl-3-methylimidazolium bis(trifluoromethylsulfonyl)imide ($EMIMTf_2N$), 1-Butyl-3-methylimidazolium bromide (BMIMBr), 1-Butyl-3-methylimidazolium chloride (BMIMCl), 1-Butyl-3-methylimidazolium bis(trifluoromethylsulfonyl)imide (BMIMTFSI), BMIMFSA, 1-Butyl-3-methylimidazolium bis(trifluoromethylsulfonyl)imide ($BMIMTf_2N$) and the like.

In another embodiment, the disclosure provides an energy storage device having an ultra-high energy density. The said device includes a Poly Ionic electrolyte comprises a finely tuned mixture of organic solvents, salts and ionic liquids.

Further, the disclosure provides a method of preparation of a Poly Ionic electrolyte used in an energy storage device. The method comprises drying a first organic solvent component and a second organic solvent component; adding a first salt component and a second salt component into the dried organic solvents; mixing the above ingredients under inert atmosphere; adding ionic liquid component under dry inert atmosphere and subsequently mixing the composition under dry inert atmosphere to obtain homogeneous solution; and storing under argon/nitrogen to suppress creepage of moisture.

In accordance with current disclosure, the electrolyte employs complex chemical side reactions much like a lithium ion battery to form thin solid electrolyte interface (SEI) layers as well as allows the use of pseudocapacitive and battery-like materials to be used in Supercapacitors. SEI formation mechanism plays an important part in facilitating high operating voltages of up to 3.5V and yielding a high tolerance to overvoltage (up to 4.5V) unlike most other commercial Supercapacitors which pose a risk if charged above their operating voltage.

Example 1: Composition of Poly-Ionic Electrolyte

In one embodiment, firstly 60 ml of propylene carbonate, as a first organic solvent component, was well-dried in a round bottom flask under argon atmosphere and subjected to strong heating at 120 deg. C. in an oil bath to remove any trace of water. Out of the said solution, 45 ml of propylene carbonate was transferred to a vessel in an inert atmosphere. Subsequently, 45 ml of Dimethyl Carbonate, as a second organic solvent component, was added while continuously stirring the mixture.

Lithium Perchlorate and TEABF4, as first salt component and a second salt component respectively, were dried very well under deep vacuum to remove any trace of moisture. Both the salt components, each having 0.25M concentration, were added to the mixture of organic solvent. The said solution was stirred under inert atmosphere, either overnight or till a homogenous solution was obtained.

To this solution, 10 mL of the EMIMBF4, as ionic liquid, was added and stirred under inert atmosphere to obtain the final mixture of the poly ionic electrolyte composition.

Electrodes were made of traditional activated carbon for comparison purposes. First, high surface area activated carbon (85%), Carbon black (5%), CMC-SBR Binder (10%) was made into a water-based slurry. This slurry was coated onto Aluminium Current collector and vacuum dried at 80 C for 6 hrs. Two electrodes of equal size were cut and fabricated into a cell. Glass fibre separator was used in between the electrodes.

We claim:

1. A poly-ionic electrolyte composition for enhancing the energy density of electronic storage device, wherein the poly-ionic electrolyte composition consists of:
   a. at least one ionic liquid,
   b. at least one salt, and
   c. at least one organic solvent selected from the group consisting of nitriles, cyclic carbonate esters of polyhydroxy alcohols, and acyclic carbonate esters;
   wherein the poly-ionic electrolyte composition has an operating voltage of between 3.5 V and 4.5V.

2. The poly-ionic electrolyte composition as claimed in claim 1, wherein the ionic liquid is present in an amount ranging from 5% to 40% by volume, based on the total volume of the electrolyte composition.

3. The poly-ionic electrolyte composition as claimed in claim 2, wherein the ionic liquid is selected from the group consisting of 1-Ethyl-3-methylimidazolium tetrafluoroborate ($EMIMBF_4$), 1-Butyl-3-methylimidazolium tetrafluoroborate ($BMIMBF_4$), 1-ethyl-3-methylimidazolium bromide (EMIMBr), 1-Ethyl-3-methylimidazolium chloride (EMIMCl), 1-Methyl-3-octylimidazolium chloride (OMIMCl), 1-Ethyl-3-methylimidazolium bis(trifluoromethylsulfonyl)imide (EMIMTFSI), 1-ethyl-3-methylimidazolium bis(fluorosulfonyl)amide (EMIMFSA), 1-Ethyl-3-methylimidazolium bis(trifluoromethanesulfonyl)imide ($EMIMTf_2N$), 1-Butyl-3-methylimidazolium bromide (BMIMBr), 1-Butyl-3-methylimidazolium chloride (BMIMCl), 1-Butyl-3-methylimidazolium bis(trifluoromethylsulfonyl)imide (BMIMTFSI), 1-Butyl-3-methylimidazolium bis(fluorosulfonyl)amide (BMIMFSA), 1-Butyl-3-methylimidazolium bis(trifluoromethanesulfonyl)imide ($BMIMTf_2N$), and mixtures thereof.

4. The poly-ionic electrolyte composition as claimed in claim 1, wherein the organic solvent is present in an amount ranging from 30% to 47.5% by volume, based on the total volume of the electrolyte composition.

5. The poly-ionic electrolyte composition as claimed in claim 4, wherein the organic solvent is selected from the group consisting of acetonitrile, cyclic carbonate esters of polyhydroxy alcohols, and acyclic carbonate esters.

6. The poly-ionic electrolyte composition as claimed in claim 1, wherein the organic solvent is selected from the group consisting of propylene carbonate, ethylene carbonate, diethyl carbonate, dimethyl carbonate, and mixtures thereof.

7. The poly-ionic electrolyte composition as claimed in claim 1, wherein the salt is present in a concentration ranging from 0.1M to 1M.

8. The poly-ionic electrolyte composition as claimed in claim 6, wherein the salt is selected from the group consisting of $LiPF_6$, $LiBF_4$, $NaBF_4$, $NaPF_6$, tetraethylammonium tetrafluoroborate ($TEABF_4$), tetraethylammonium hexafluorophosphate ($TEAPF_6$), spirobipyrrolidinium tetrafluoroborate (SBP—$BF_4$), and combinations thereof.

9. A poly-ionic electrolyte composition for enhancing the energy density of electronic storage device, wherein the poly-ionic electrolyte composition comprises:
   a. a liquid medium consisting of:
      i. an ionic liquid present in an amount ranging from 5% to 40% by volume;
      ii. a first organic solvent present in an amount ranging from 30% to 47.5% by volume; and
      iii. a second organic solvent present in an amount ranging from 30% to 47.5% by volume;
   b. a first salt component present in a concentration ranging from 0.1M to 1M, and
   c. a second salt component present in a concentration ranging from 0.1M to 1M;
      wherein the poly-ionic electrolyte composition has an operating voltage of between 3.5 V and 4.5V;
      wherein the first and second organic solvents are each independently selected from the group consisting of nitriles, cyclic carbonate esters of polyhydroxy alcohols, and acyclic carbonate esters.

10. The poly-ionic electrolyte composition as claimed in claim 9, wherein the ionic liquid is selected from the group consisting of 1-Ethyl-3-methylimidazolium tetrafluoroborate ($EMIMBF_4$), 1-Butyl-3-methylimidazolium tetrafluoroborate ($BMIMBF_4$), 1-ethyl-3-methylimidazolium bromide (EMIMBr), 1-Ethyl-3-methylimidazolium chloride (EMIMCl), 1-Methyl-3-octylimidazolium chloride (OMIMCl), 1-Ethyl-3-methylimidazolium bis(trifluoromethylsulfonyl)imide (EMIMTFSI), 1-ethyl-3-methylimidazolium bis(fluorosulfonyl)amide (EMIMFSA), 1-Ethyl-3-methylimidazolium bis(trifluoromethanesulfonyl)imide ($EMIMTf_2N$), 1-Butyl-3-methylimidazolium bromide (BMIMBr), 1-Butyl-3-methylimidazolium chloride (BMIMCl), 1-Butyl-3-methylimidazolium bis(trifluoromethylsulfonyl)imide (BMIMTFSI), 1-Butyl-3-methylimidazolium bis(fluorosulfonyl)amide (BMIMFSA), 1-Butyl-3-methylimidazolium bis(trifluoromethanesulfonyl)imide ($BMIMTf_2N$), and mixtures thereof.

11. The poly-ionic electrolyte composition as claimed in claim 9, wherein the first and second organic solvents are each independently selected from the group consisting of propylene carbonate, ethylene carbonate, diethyl carbonate, dimethyl carbonate, and mixtures thereof.

12. The poly-ionic electrolyte composition as claimed in claim 9, wherein the first and second salt components are each independently selected from the group consisting of $LiPF_6$, $LiBF_4$, $NaBF_4$, $NaPF_6$, tetraethylammonium tetrafluoroborate ($TEABF_4$), tetraethylammonium hexafluorophosphate ($TEAPF_6$), spirobipyrrolidinium tetrafluoroborate (SBP—$BF_4$), and combinations thereof.

13. An energy storage device comprising the poly-ionic electrolyte as claimed in claim 1.

14. An energy storage device comprising the poly-ionic electrolyte as claimed in claim 9.

15. A method for preparing a poly-ionic electrolyte composition for enhancing the energy density of electronic storage device,
   wherein the poly-ionic electrolyte composition comprises at least one ionic liquid, at least one salt, and at least one organic solvent, and has an operating voltage of between 3.5 V and 4.5V, wherein the method comprises:
   b. drying the organic solvent;
   c. adding the salt to the organic solvent to form a salt solution under an inert atmosphere;
   d. adding the ionic liquid to the salt solution of Step (b) under the inert atmosphere, and
   e. subsequently mixing the composition under the inert atmosphere to obtain a homogeneous solution.

16. A method for preparing a poly-ionic electrolyte composition for enhancing the energy density of electronic storage device, wherein the poly-ionic electrolyte composition comprises:
   an ionic liquid present in an amount ranging from 5% to 40% by volume, a first organic solvent present in an amount ranging from 30% to 47.5% by volume, and a second organic solvent present in an amount ranging from 30% to 47.5% by volume, based on the total volume of the electrolyte composition; and
   a first salt component present in a concentration ranging from 0.1M to 1M, and a second salt component present in a concentration ranging from 0.1M to 1M;
   wherein the poly-ionic electrolyte composition has an operating voltage of between 3.5 V and 4.5V,
   wherein the method comprises:
   a. drying the first organic solvent and the second organic solvent;
   b. mixing the first organic solvent and the second organic solvent to form a solvent mixture;
   c. adding the first salt component and the second salt component into the solvent mixture of step (b) to form a salt solution;
   d. stirring the salt solution of step (c) under an inert atmosphere;
   e. adding the ionic liquid to the mixture of Step (d) under the inert atmosphere, and
   f. subsequently mixing the composition under the inert atmosphere to obtain a homogeneous solution.

* * * * *